(12) United States Patent
Asatsuke et al.

(10) Patent No.: US 6,347,557 B1
(45) Date of Patent: Feb. 19, 2002

(54) AUTOMATIC TRANSMISSION CONTROL SYSTEM

(75) Inventors: Shoji Asatsuke; Tatsuyuki Ohashi; Takamichi Shimada; Takayuki Yamaguchi; Hideki Wakamatsu, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/556,100

(22) Filed: Apr. 20, 2000

(30) Foreign Application Priority Data

Apr. 27, 1999 (JP) ............................. 11-119658

(51) Int. Cl.$^7$ ............................. F16H 61/18
(52) U.S. Cl. .................................... 74/336 R
(58) Field of Search ..................... 477/126; 74/335, 74/336 R

(56) References Cited

U.S. PATENT DOCUMENTS

| | | | |
|---|---|---|---|
| 4,419,909 A | * 12/1983 | Opperud et al. | ............ 477/126 |
| 4,843,909 A | 7/1989 | Hasegawa et al. | |
| 4,942,782 A | * 7/1990 | Kuwayama et al. | ........ 477/126 |
| 5,074,168 A | * 12/1991 | Ishikawa et al. | ........... 477/126 |
| 5,079,973 A | * 1/1992 | Ookubo et al. | ............. 477/126 |
| 5,364,317 A | 11/1994 | Amemiya | |
| 5,409,434 A | 4/1995 | Furukawa et al. | |
| 5,433,124 A | * 7/1995 | Person | ....................... 477/126 |

FOREIGN PATENT DOCUMENTS

| | | |
|---|---|---|
| EP | 0 668 455 A1 | 8/1995 |
| EP | 0 833 808 A2 | 4/1996 |
| JP | 4-296250 A | * 10/1992 |
| JP | 5-209683 | 8/1993 |
| JP | 5-215228 | 8/1993 |

* cited by examiner

Primary Examiner—Charles A Marmor
Assistant Examiner—Ankur Parekh
(74) Attorney, Agent, or Firm—Arent Fox Kintner Plotkin & Kahn, PLLC

(57) ABSTRACT

An automatic transmission comprises a plurality of clutches 11~15, which are provided to select power transmission paths, respectively, in a parallel shaft speed change mechanism TM and a plurality of shift valves 60~68, which are used for controlling the supply and drain of hydraulic oil to and from these clutches. For this automatic transmission, a control system comprises a plurality of solenoid valves 81~85, which are used for controlling the supply and drain of a line pressure so as to control the actuation of these shift valves. This system, when the shift lever is manipulated to set the neutral range, sets the transmission into either a first neutral mode or a second neutral mode depending upon the speed of the vehicle, the first neutral mode being set when the vehicle is driving at a speed equal to or more than a critical speed, and the second neutral mode being set when the vehicle speed is less than the critical speed. In this control, the combination of on/off operations of the solenoid valves for setting the first neutral mode is different from the combination for setting the second neutral mode.

4 Claims, 10 Drawing Sheets

AUTOMATIC TRANSMISSION CONTROL SYSTEM

FIELD OF THE INVENTION

The present invention relates to an automatic transmission which comprises a power transmission mechanism incorporating a plurality of power transmission paths and a plurality of hydraulically operated frictionally engaging means. These hydraulically operated frictionally engaging means are controlled to select these power transmission paths individually, by means of hydraulic oil which is supplied through a plurality of shift control valves.

BACKGROUND OF THE INVENTION

Such automatic transmissions have been known and are utilized, for example, as automatic transmissions for vehicles. Typically, an automatic transmission designed for use in a vehicle operates such that the transmission automatically controls the actuation of hydraulic clutches to change the speed change ratio in correspondence to the driving condition of the vehicle. Generally, the automatic transmission includes a speed change hydraulic unit which comprises a plurality of shift control valves, a solenoid valve to control the actuation of these shift control valves, and a manual valve operated in correspondence to the movement of the shift lever manipulated by a driver. In this arrangement, the automatic transmission automatically performs speed change control for a plurality of ranges, i.e., a reverse drive range, a neutral range and a forward drive range (D range, Second, First, etc.) which are individually selected by the operation of the manual valve operated in correspondence to the manipulation of the shift lever (generally, this automatic control is effective only in the forward drive range).

Recently, another type of automatic transmission has been introduced. This automatic transmission does not use a manual valve for the selection of a range and controls the shift of speed change ratios in each range solely by electrical signals. Such transmissions are disclosed in Japanese Laid-Open Patent Publication Nos. H5 (1993)-209683 (A) and H5 (1993)-215228 (A). Each automatic transmission disclosed there comprises a plurality of solenoid valves to control the actuation of shift control valves. The selection of the ranges, i.e., the forward drive range, the neutral range, and the reverse drive range, as well as the selection of the speed change ratios in the forward drive range are performed in correspondence to the command signals (electrical signals ) which actuate these solenoid valves.

In such a speed change control system, as the selecting or switching of drive ranges and the setting of speed change ratios are controlled solely by the control pressures which are supplied from solenoid valves, for example, the switching of drive ranges is controlled simply by the manipulation of the shift lever. However, this simplicity presents a serious problem that when the shift lever is manipulated from the forward range through the neutral range to the reverse drive range (this manipulation is referred here as "D-N-R manipulation"), a power transmission path for a reverse drive may be set even while the vehicle is driving forward.

As a preventive measure against such an adversity, a prior-art automatic transmission has been equipped with a reverse inhibitor, which functions to prevent the transmission from shifting into the reverse drive range when a D-N-R manipulation is carried out while the vehicle is driving forward. In other words, the speed of the vehicle must decrease to a predetermined level for the transmission to shift into the reverse drive range. However, a control system of the above described type, which does not include a manual valve, establishes a neutral range solely by a combination of command signals which actuate solenoid valves. It is important or necessary for the reverse inhibitor function of the system to be activated or deactivated in correspondence to the momentary condition of the transmission when the neutral range is to be established. The inclusion of such reverse inhibitor control makes the control system complex, and if a solenoid valve malfunctions while the neutral range is established, there is a possibility that a speed change ratio for the reverse drive range may be selected accidentally.

SUMMARY OF THE INVENTION

It is an object of the present invention to provide a control system for an automatic transmission, which system offers a reverse inhibitor function simply and reliably if a D-N-R manipulation is carried out while the vehicle is driving forward.

Another object of the present invention is to provide a control system for an automatic transmission, which system can prevent the transmission whose reverse inhibitor function is activated, from shifting into the reverse drive range in an event that a solenoid valve malfunctions.

In order to achieve these objectives, the present invention provides a control system for an automatic transmission which comprises a power transmission mechanism (for example, the parallel shaft speed change mechanism TM of the preferred embodiment described in the following section), a plurality of hydraulically operated frictionally engaging means (for example, the LOW clutch 11, the SECOND speed clutch 12, the THIRD speed clutch 13, the FOURTH speed clutch 14 and the FIFTH speed clutch 15 of the preferred embodiment) and a plurality of shift control valves (for example, the first shift valve 60, the second shift valve 62, the third shift valve 64, the fourth shift valve 66, the fifth shift valve 68, the CPB valve 56 and the D inhibitor valve 58 of the preferred embodiment). The power transmission mechanism incorporates a plurality of power transmission paths, and the hydraulically operated frictionally engaging means are activated by the supply of hydraulic oil regulated by the shift control valves for the selection of the power transmission paths individually in the power transmission mechanism. This control system comprises a plurality of solenoid valves (for example, the first~fifth on/off solenoid valves 81~85 ) for supplying and draining a line pressure. In this arrangement, the line pressure supplied and drained from the solenoid valves are used to actuate the shift control valves for selecting the power transmission paths in speed change control. For controlling the selection, a plurality of combinations of on/off operations of the solenoid valves are switched to select the power transmission paths individually so as to establish a forward drive range, a neutral range and a reverse drive range in response to a shift manipulation (a manipulation of the shift lever). In this system, the neutral range comprises a first neutral mode and a second neutral mode which are set in response to the shift manipulation carried out to establish the neutral range. The first neutral mode is set if the vehicle incorporating this automatic transmission is driving at a speed equal to or more than a critical speed, and the second neutral mode is set if the vehicle is driving at a speed less than the critical speed. In this case, the combination of on/off operations of the solenoid valves used for setting the first neutral mode is different from that used for the second neutral mode.

In this control system, it is not desirable that the transmission be shifted to the reverse range while the first neutral mode is taking place. Therefore, the system offers a reverse inhibitor function which forbids the transmission to shift into the reverse range while it is in the first neutral mode. On the other hand, while the transmission is in the second neutral mode, the transmission can be shifted either to the forward range or to the reverse range. As the pattern of on/off operations of the solenoid valves is set differently for the first neutral mode and for the second neutral mode, the transmission can be controlled simply and securely to shift into a driving mode which includes this inhibitor function or into a mode which does not include the inhibitor function. Therefore, it is preferable that when the first neutral mode is once set, the system retain the combination of on/off operations of the solenoid valves for setting the first neutral mode as long as the vehicle speed is equal to or more than the critical speed even if a shift manipulation to the reverse range is carried out by the driver. In this way, the system can provide a perfect inhibitor function.

It is preferable that the system further comprise a forward/reverse hydraulic servomechanism (for example, the forward/reverse selection hydraulic servomechanism 70 of the preferred embodiment) for selecting either the power transmission paths which belong to the forward drive range or the power transmission paths which belong to the reverse drive range. In this case, preferably, the system be constructed such that while the transmission is in the first neutral mode, the forward/reverse hydraulic servomechanism selects the power transmission paths of the forward drive range. With this construction of the control system, as the forward/reverse hydraulic servomechanism selects the power transmission paths of the forward drive range while the transmission is in the first neutral mode, even if, for example, a solenoid valve malfunctions electrically or a shift valve malfunctions mechanically, there is no possibility for any power transmission path of the reverse drive range to be established.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only and thus are not limitative of the present invention and wherein.

DETAILED DESCRIPTION OF THE PREFERRED EMBODIMENTS

FIGS. 1 through 4 show an automatic transmission which incorporates a control system according to the present invention. In a transmission housing HSG, this transmission comprises a torque converter TC, which is connected to the output shaft of an engine (not shown), a parallel shaft speed change mechanism TM, which is connected to the output member (or turbine) of the torque converter TC, and a differential mechanism DF including a last reduction driven gear 6b, which meshes with a last reduction drive gear 6a provided in the speed change mechanism TM. The drive power for the vehicle is transmitted through the differential mechanism DF to lateral wheels.

Figure 4:
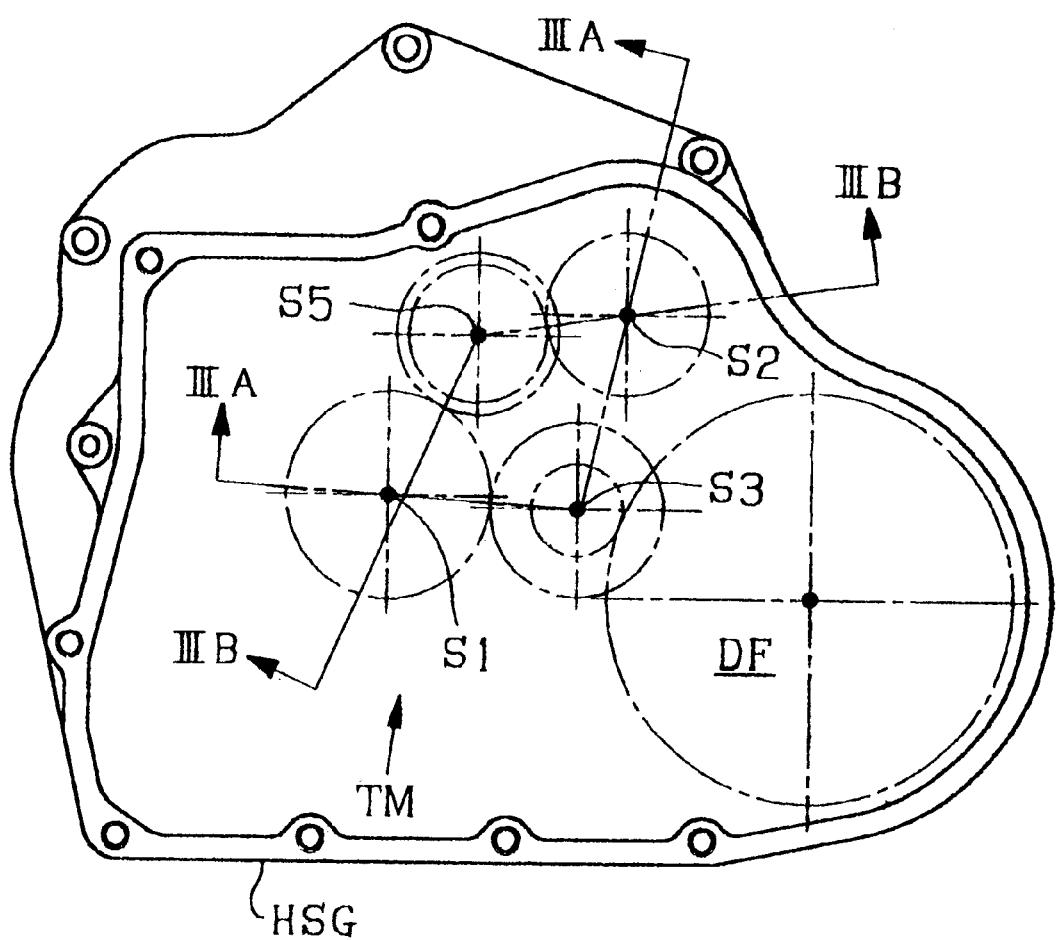
FIG. 4 is a schematic diagram showing the relative positions of the shafts of the automatic transmission.

The parallel shaft speed change mechanism TM includes a first input shaft 1, a second input shaft 2, a countershaft 3, and an idle shaft 5, all of which are disposed parallel with one another. FIG. 4 shows the positions of these shafts in the housing, the centers of the shafts being indicated by corresponding alphanumeric marks, S1, S2, S3 and 5. FIGS. 3A and 3B show the rotational components of the speed change mechanism TM, which are arranged for mechanical power transmission. FIG. 3A is a schematic sectional view showing the first input shaft 1 (S1), the second input shaft 2 (S2) and the countershaft 3 (S3), which are taken along line IIIA—IIIA in FIG. 4, while FIG. 3B is a schematic sectional view showing the first input shaft 1 (S1), the second input shaft 2 (S2) and the idle shaft 5 (S5), which are taken along line IIIB—IIIB in FIG. 4. Furthermore, FIG. 1 corresponds with FIG. 3A while FIG. 2 corresponds with FIG. 3B, all of which are sectional views of the speed change mechanism TM.

The first input shaft 1 is connected directly to the turbine of the torque converter TC and is supported rotatably by bearings 41a and 41b. The first input shaft 1 receives the drive power from the turbine and rotates with it at the same rotational speed. On this input shaft 1, from the side of the torque converter TC (i.e., the right side of the drawing), disposed are a FIFTH speed drive gear 25a, a FIFTH speed clutch 15, a FOURTH speed clutch 14, a FOURTH speed drive gear 24a, a reverse drive gear 26a, and a first connection gear 31. The FIFTH speed drive gear 25a is disposed rotatably on the first input shaft 1, and the FIFTH speed clutch 15, which is actuated hydraulically, engages with the FIFTH speed drive gear 25a to connect it rotationally to the first input shaft 1. The FOURTH speed drive gear 24a and the reverse drive gear 26a, which are coupled as one body, are disposed rotatably on the first input shaft 1, and the FOURTH speed clutch 14, which is actuated hydraulically, engages with these gears to connect them rotationally to the first input shaft 1. The first connection gear 31 is mounted on the first input shaft 1, at the left end thereof outside the bearing 41a, which supports the first input shaft 1 rotatably. In this condition, the first connection gear 31 and this end portion of the first input shaft 1 are supported only by this bearing 41a in cantilever.

The second input shaft 2 is also supported rotatably by bearings 42a and 42b. On this input shaft 2, from the right side of the drawing, disposed are a SECOND speed clutch 12, a SECOND speed drive gear 22a, a LOW drive gear 21a, a LOW clutch 11, a THIRD speed clutch 13, a THIRD speed drive gear 23a, and a fourth connection gear 34. The SECOND speed drive gear 22a, the LOW drive gear 21a and the THIRD speed drive gear 23a are each disposed rotatably on the second input shaft 2, and the SECOND speed clutch 12, the LOW clutch 11, or the THIRD speed clutch 13, which is actuated hydraulically, engages with the respective gear to connect it rotationally to the second input shaft 2. In addition, the fourth connection gear 34 is coupled to the second input shaft 2.

The idle shaft 5 including a second connection gear 32 and a third connection gear 33, which are formed as one body with the idle shaft 5, is supported rotatably by bearings 45a and 45b. The second connection gear 32 meshes with the first connection gear 31 while the third connection gear 33 meshes with the fourth connection gear 34. The first, second, third and fourth connection gears constitute a connection gear train 30, through which the rotation of the first input shaft 1 is transmitted continually to the second input shaft 2.

The countershaft 3 is supported rotatably by bearings 43a and 43b. On this shaft 3, from the right side of the drawing, disposed are the above mentioned last reduction drive gear 6a, a SECOND speed driven gear 22b, a LOW driven gear 21b, a FIFTH speed driven gear 25b, a THIRD speed driven gear 23b, a FOURTH speed driven gear 24b, a dog clutch 16, and a reverse driven gear 26c. The last reduction drive gear 6a, the SECOND speed driven gear 22b, the LOW driven gear 21b, the FIFTH speed driven gear 25b and the THIRD speed driven gear 23b are fixed on and rotate together with the countershaft 3 while the FOURTH speed driven gear 24b and the reverse driven gear 26c are each disposed rotatably on the countershaft 3. The dog clutch 16 is actuated axially in one direction to engage with the FOURTH speed driven gear 24b so as to connect it rotationally to the countershaft 3 or in the opposite direction to engage with the reverse driven gear 26c so as to connect it rotationally to the countershaft 3.

As shown in the drawings, the LOW drive gear 21a meshes with the LOW driven gear 21b; the SECOND speed drive gear 22a meshes with the SECOND speed driven gear 22b; the THIRD speed drive gear 23a meshes with the THIRD speed driven gear 23b; the FOURTH speed drive gear 24a meshes with the FOURTH speed driven gear 24b; and the FIFTH speed drive gear 25a meshes with the FIFTH speed driven gear 25b. In addition, the reverse drive gear 26a meshes with a reverse idler gear 26b (refer to FIG. 2), which then meshes with the reverse driven gear 26c.

Figure 1:
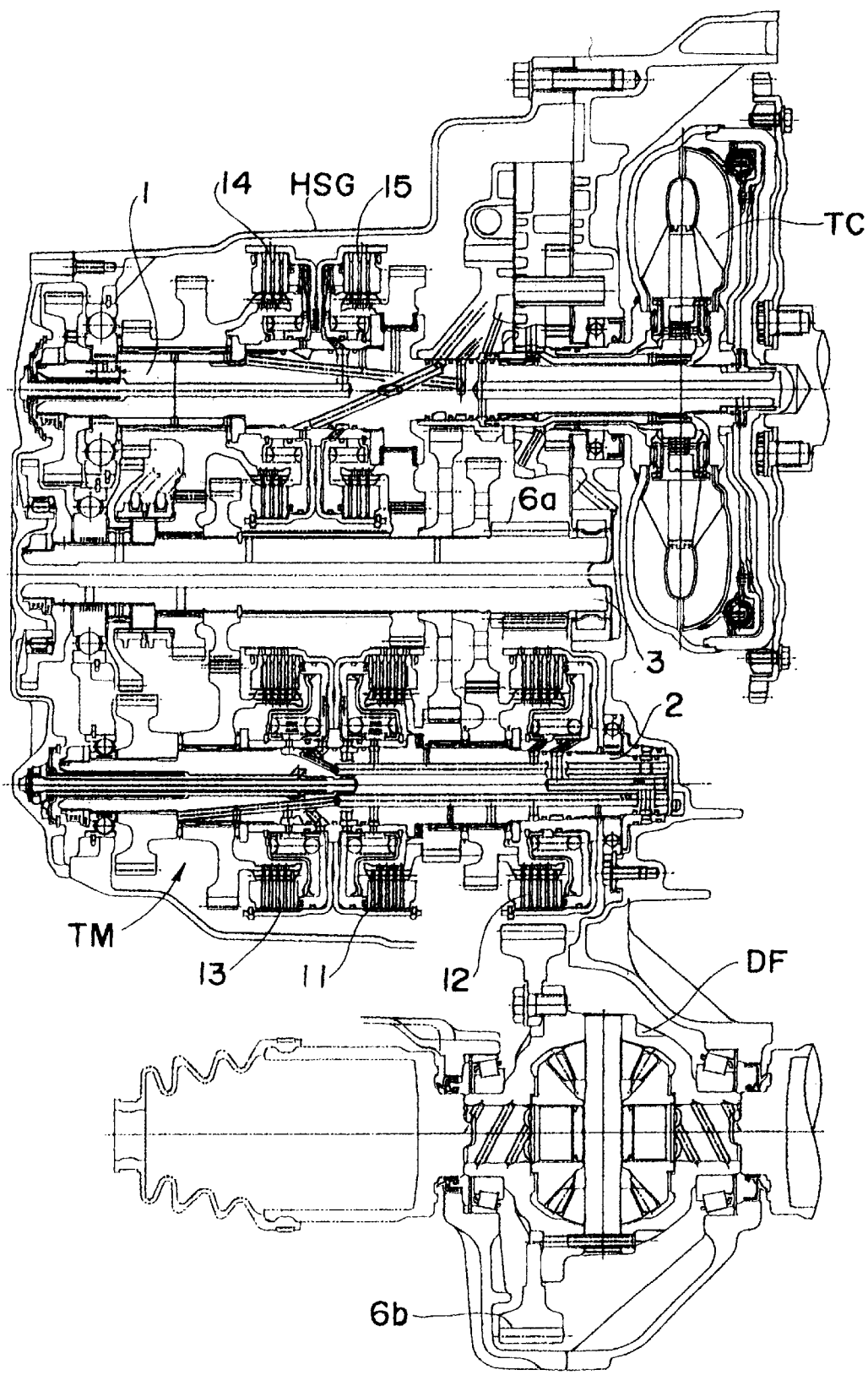
FIG. 1 is a sectional view of an automatic transmission whose speed change is controlled by a control system according to the present invention.
Figure 2:
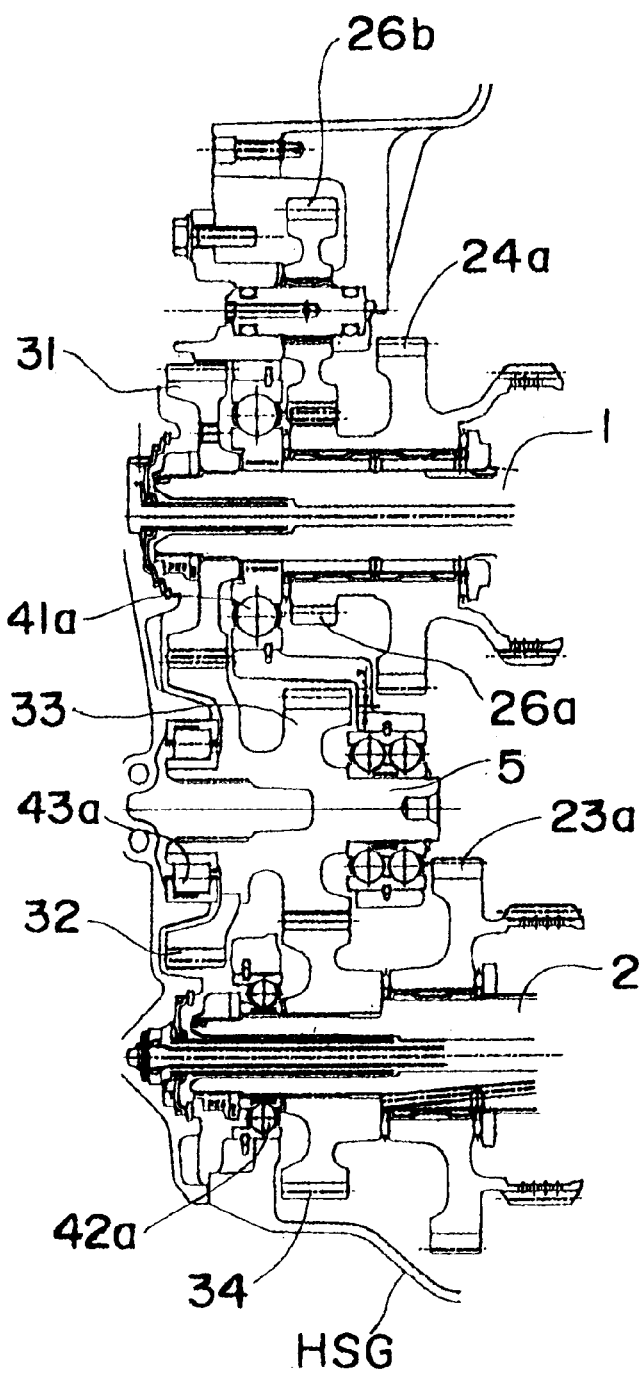
FIG. 2 is a partial sectional view of the automatic transmission.
Figure 3:
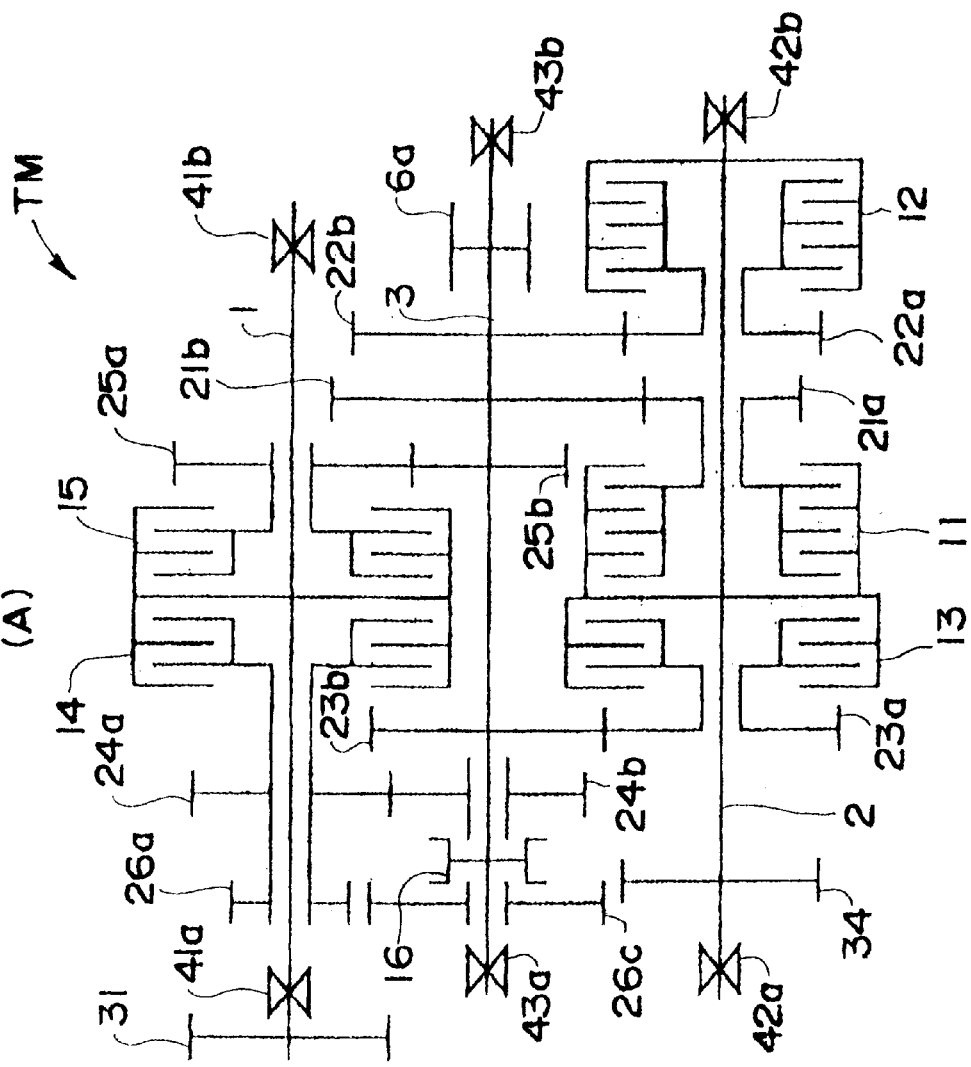
FIG. 3 is a skeleton diagram which shows schematically the power transmission system of the automatic transmission.
Figure 3:
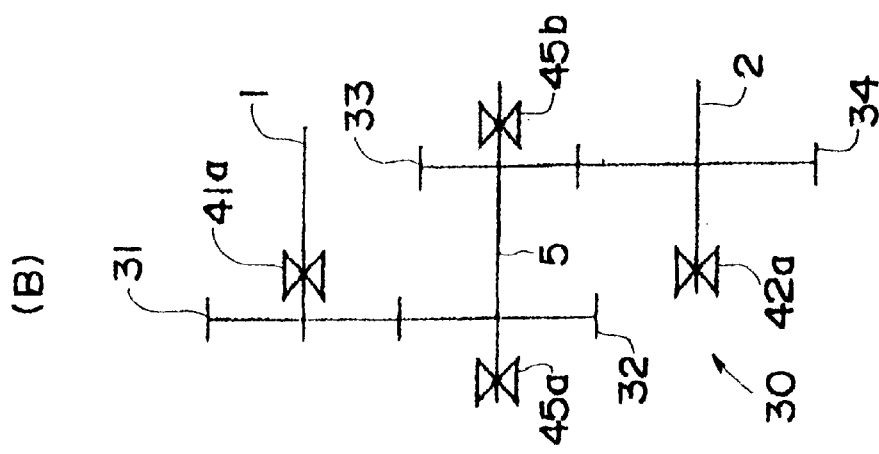

The last reduction drive gear 6a meshes with the last reduction driven gear 6b (refer to FIG. 1, which shows that they are situated at the same position in the axial direction though the drawing does not show the actual condition that they mesh with each other). The rotation of the countershaft 3 is transmitted through the last reduction drive and driven gears 6a and 6b to the differential mechanism DF.

Now, a description is given of how each speed ratio is established and through which path the drive power is transmitted at each speed ratio. In this transmission, for establishing the forward drive range, the dog clutch 16 is shifted toward the right side of the drawing, where the dog clutch 16 engages with the FOURTH speed driven gear 24b to connect it rotationally to the countershaft 3. For the reverse drive range, the dog clutch 16 is shifted leftward, where the dog clutch 16 engages with the reverse driven gear 26c to connect it rotationally to the countershaft 3.

First, the establishment of each speed ratio of the forward drive range is described. The LOW ratio is established when the LOW clutch 11 is engaged. The rotational drive power which is input from the torque converter TC to the first input shaft 1 is transmitted through the connection gear train 30 to the second input shaft 2. Because the LOW clutch 11 is engaged, the LOW drive gear 21a which is driven at the same rotational speed as the second input shaft 2 drives the LOW driven gear 21b mounted on the countershaft 3. This drive power is then transmitted through the last reduction drive and driven gears 6a and 6b to the differential mechanism DF.

The SECOND speed ratio is established when the SECOND speed clutch 12 is engaged. The rotational drive power which is input from the torque converter TC to the first input shaft 1 is transmitted through the connection gear train 30 to the second input shaft 2. Because the SECOND speed clutch 12 is engaged, the SECOND speed drive gear 22a which is driven at the same rotational speed as the second input shaft 2 drives the SECOND speed driven gear 22b mounted on the countershaft 3. This drive power is then transmitted through the last reduction drive and driven gears 6a and 6b to the differential mechanism DF.

The THIRD speed ratio is established when the THIRD speed clutch 13 is engaged. The rotational drive power which is input from the torque converter TC to the first input shaft 1 is transmitted through the connection gear train 30 to the second input shaft 2. Because the THIRD speed clutch 13 is engaged, the THIRD speed drive gear 23a which is driven at the same rotational speed as the second input shaft 2 drives the THIRD speed driven gear 23b mounted on the countershaft 3. This drive power is then transmitted through the last reduction drive and driven gears 6a and 6b to the differential mechanism DF.

The FOURTH speed ratio is established when the FOURTH speed clutch 14 is engaged. The rotational drive power which is input from the torque converter TC to the first input shaft 1 is transmitted through the FOURTH speed clutch 14 to the FOURTH speed drive gear 24a, which drives the FOURTH speed driven gear 24b. Because the dog clutch 16 is kept engaged with the FOURTH speed driven gear 24b for the forward drive range, the countershaft 3 is driven. This drive power is then transmitted through the last reduction drive and driven gears 6a and 6b to the differential mechanism DF.

The FIFTH speed ratio is established when the FIFTH speed clutch 15 is engaged. The rotational drive power which is input from the torque converter TC to the first input shaft 1 is transmitted through the FIFTH speed clutch 15 to the FIFTH speed drive gear 25a, which drives the FIFTH speed driven gear 25b. The FIFTH speed driven gear 25b, which is fixed to the countershaft 3, in turn, drives the countershaft 3. This drive power is then transmitted through the last reduction drive and driven gears 6a and 6b to the differential mechanism DF.

The reverse drive range is established when the FOURTH speed clutch 14 is engaged, and the dog clutch 16 is shifted leftward. The rotational drive power which is input from the torque converter TC to the first input shaft 1 is transmitted through the FOURTH speed clutch 14 to the reverse drive gear 26a, which, in turn, drives the reverse driven gear 26c through the reverse idler gear 26b. Because the dog clutch 16 is engaged with the reverse driven gear 26c for the reverse drive range, the countershaft 3 is driven. This drive power is then transmitted through the last reduction drive and driven gears 6a and 6b to the differential mechanism DF. It should be noted that, as described in this paragraph, the FOURTH speed clutch 14 is used as a reverse clutch for the establishment of the reverse drive range in this transmission in addition to the establishment of the above described FOURTH speed ratio.

Now, in reference to FIGS. 5~10, a description is made of a hydraulic circuit which constitutes a speed change control system in this automatic transmission. FIGS. 6~10 show five sections of the hydraulic circuit at an enlarged scale, which sections are partitioned by alternate long and short dash lines A~E, respectively, in FIG. 5. The points of the oil passages shown open in the hydraulic circuit diagram are connected to a drainage system.

This hydraulic circuit includes an oil pump OP being driven by the engine to supply working oil from an oil tank OT to an oil passage 100. This oil passage 100 is connected through a branch passage 100a to a main regulator valve 50, where the pressure of the oil in the oil passages 100 and 100a is adjusted to a predetermined line pressure PL. This line pressure PL is then supplied through another branch passage 100b to first~fifth on/off solenoid valves 81~85 and to a first linear solenoid valve 86.

Surplus oil from the oil used for the generation of the line pressure PL at the main regulator valve 50 is led to an oil passage 101 and then to another oil passage 102. The oil flowing to the passage 101 is regulated by a lock-up shift valve 51, a lock-up control valve 52 and a torque converter check valve 53, and the oil is used for actuating and locking up the torque converter TC. After being used for the control of the torque converter TC, this oil returns through an oil cooler 54 to the oil tank OT. In this description, no explanation is given of the control of the torque converter TC because the control of the torque converter is not related directly to the present invention. The pressure of the oil supplied to the passage 102 is adjusted by a lubrication relief valve 55, and this oil is used for lubricating various parts of the transmission.

Figure 5:
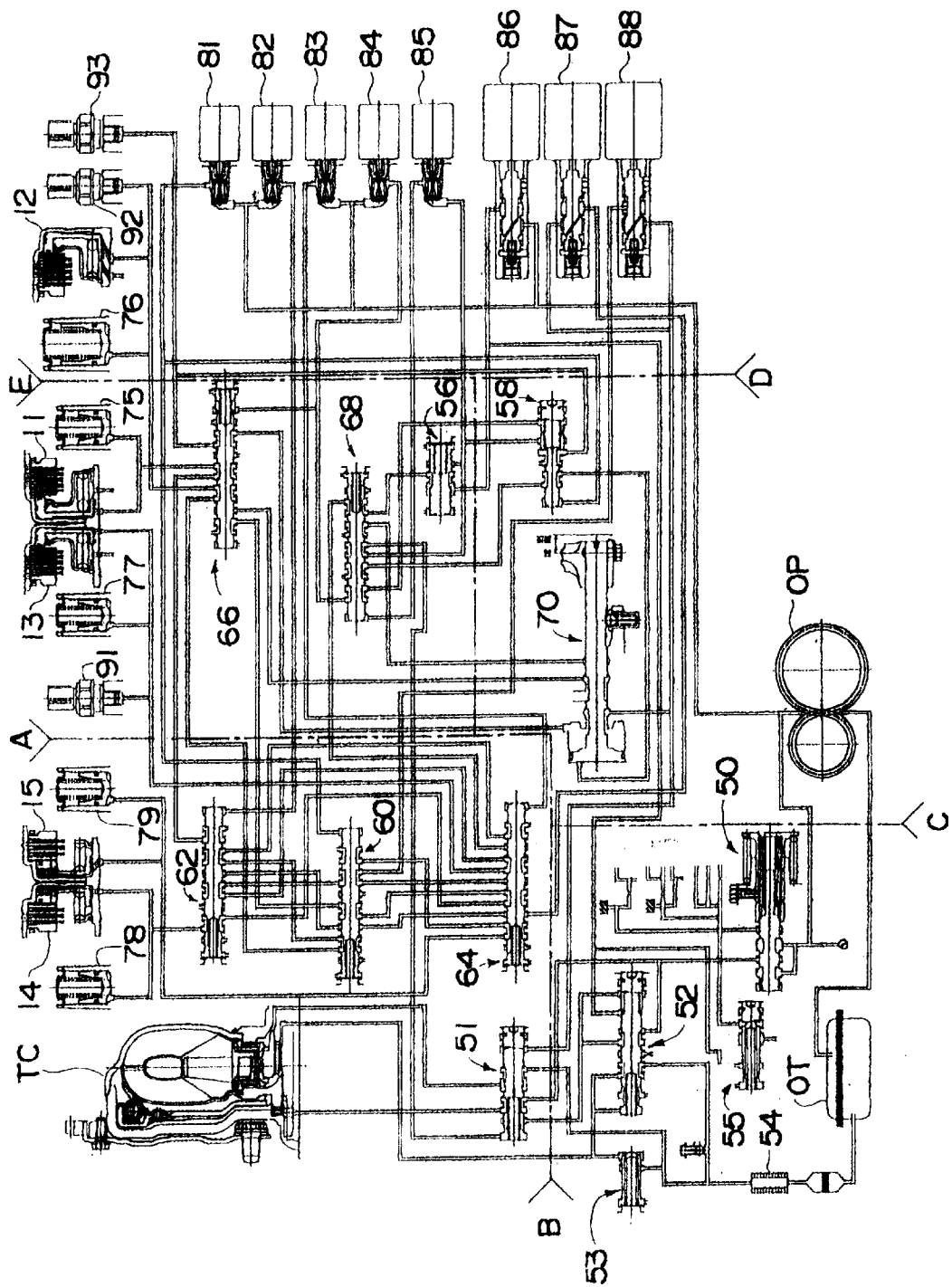
FIG. 5 is a diagram showing a hydraulic circuit which constitutes a control system according to the present invention.
Figure 6:
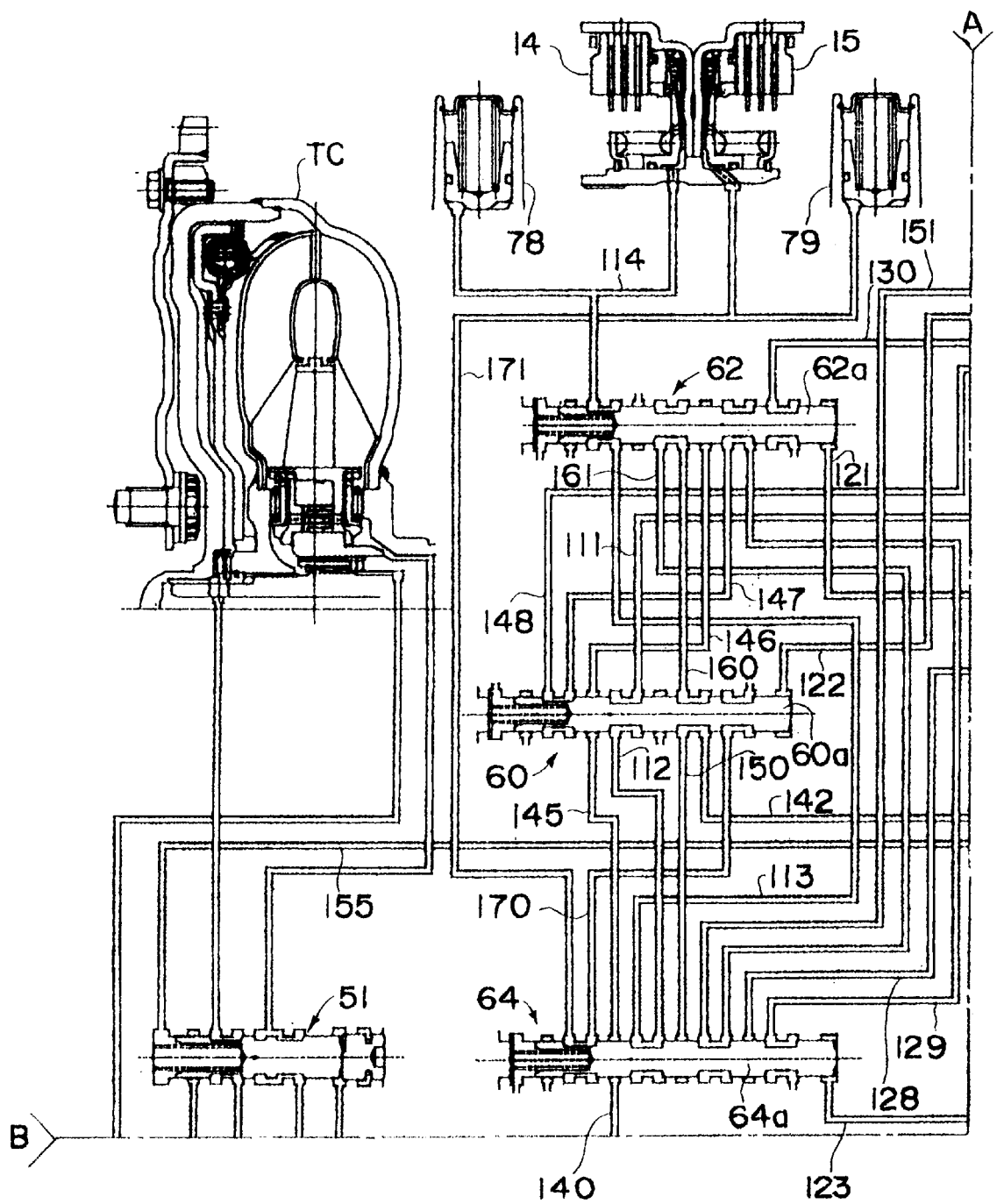
FIGS. 6~10 are diagrams, each showing part of the diagram of FIG. 5, respectively, in enlargement.
Figure 7:
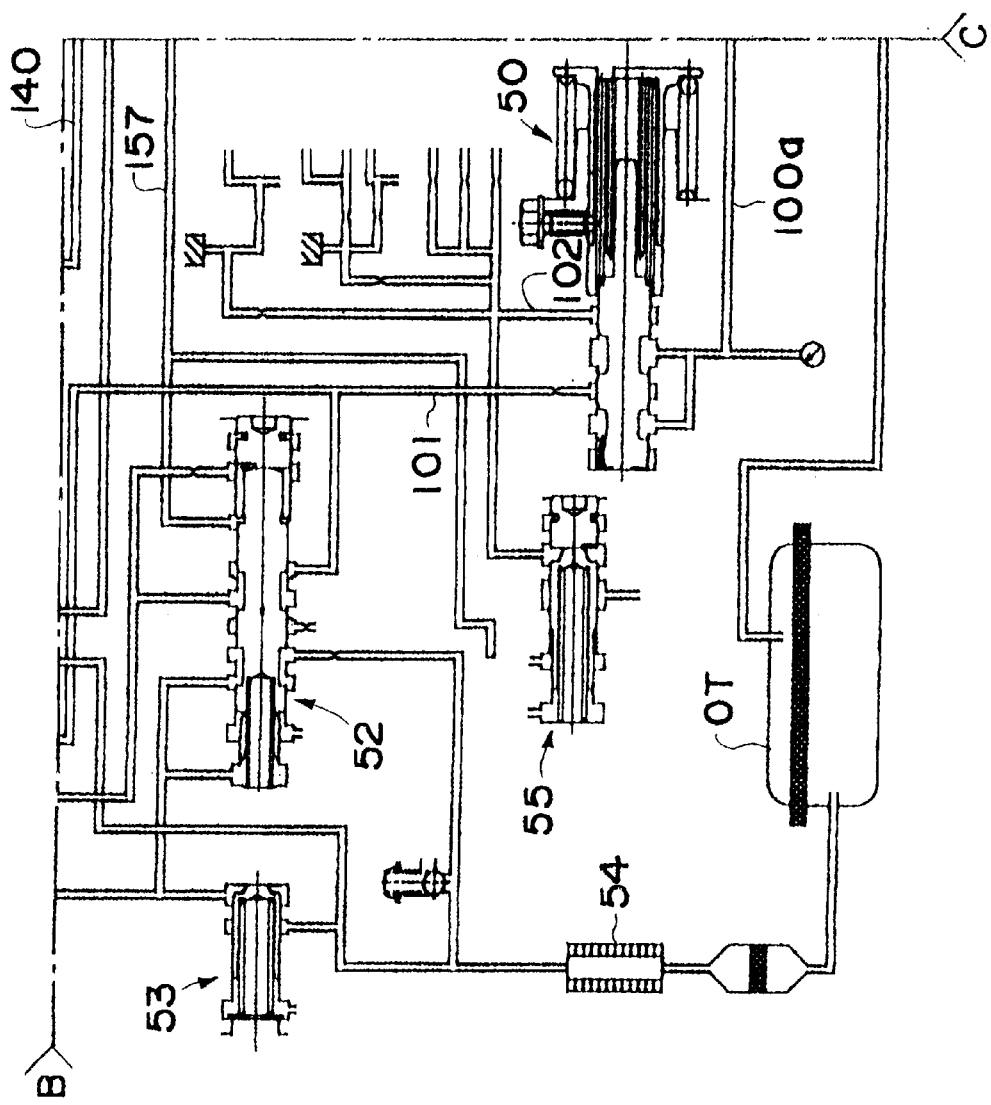
Figure 8:
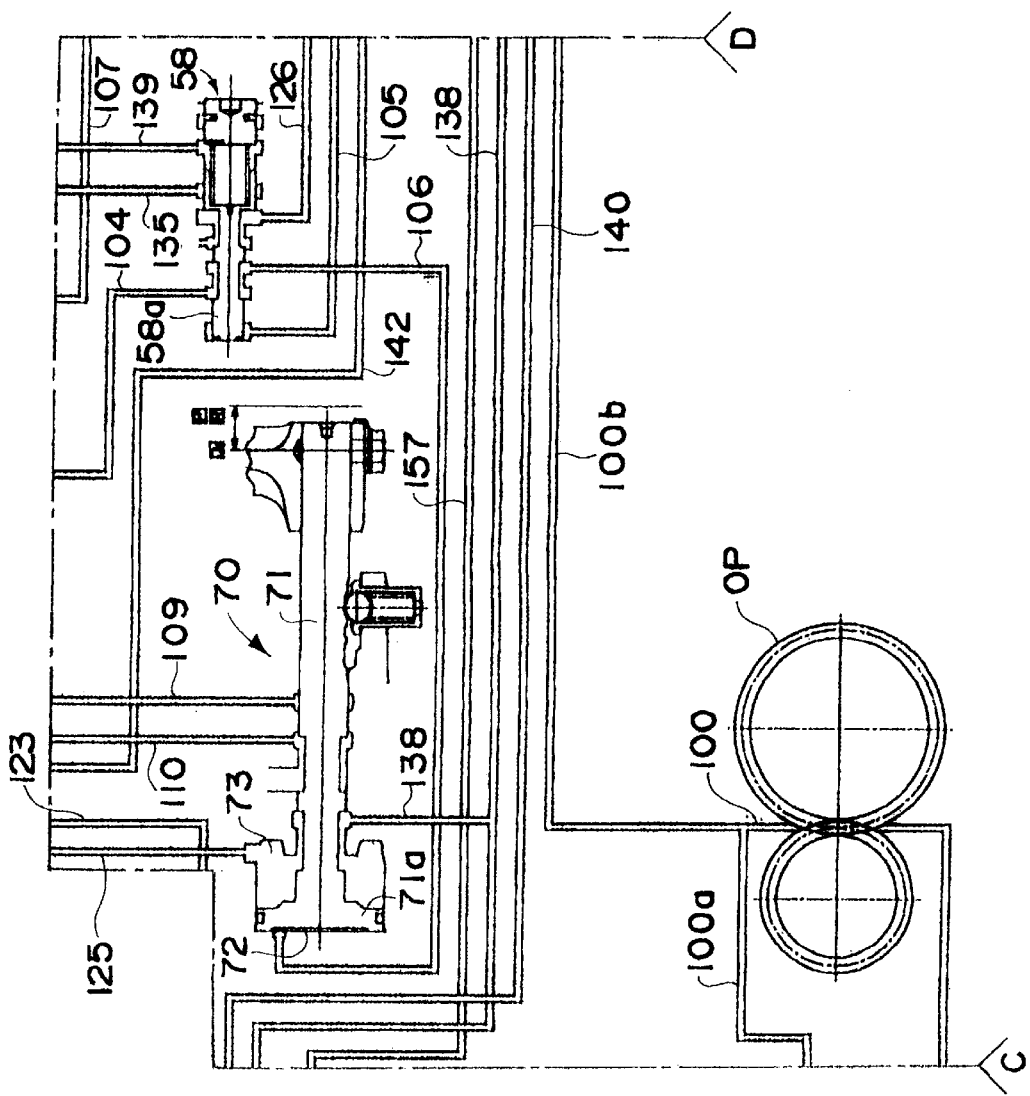
Figure 9:
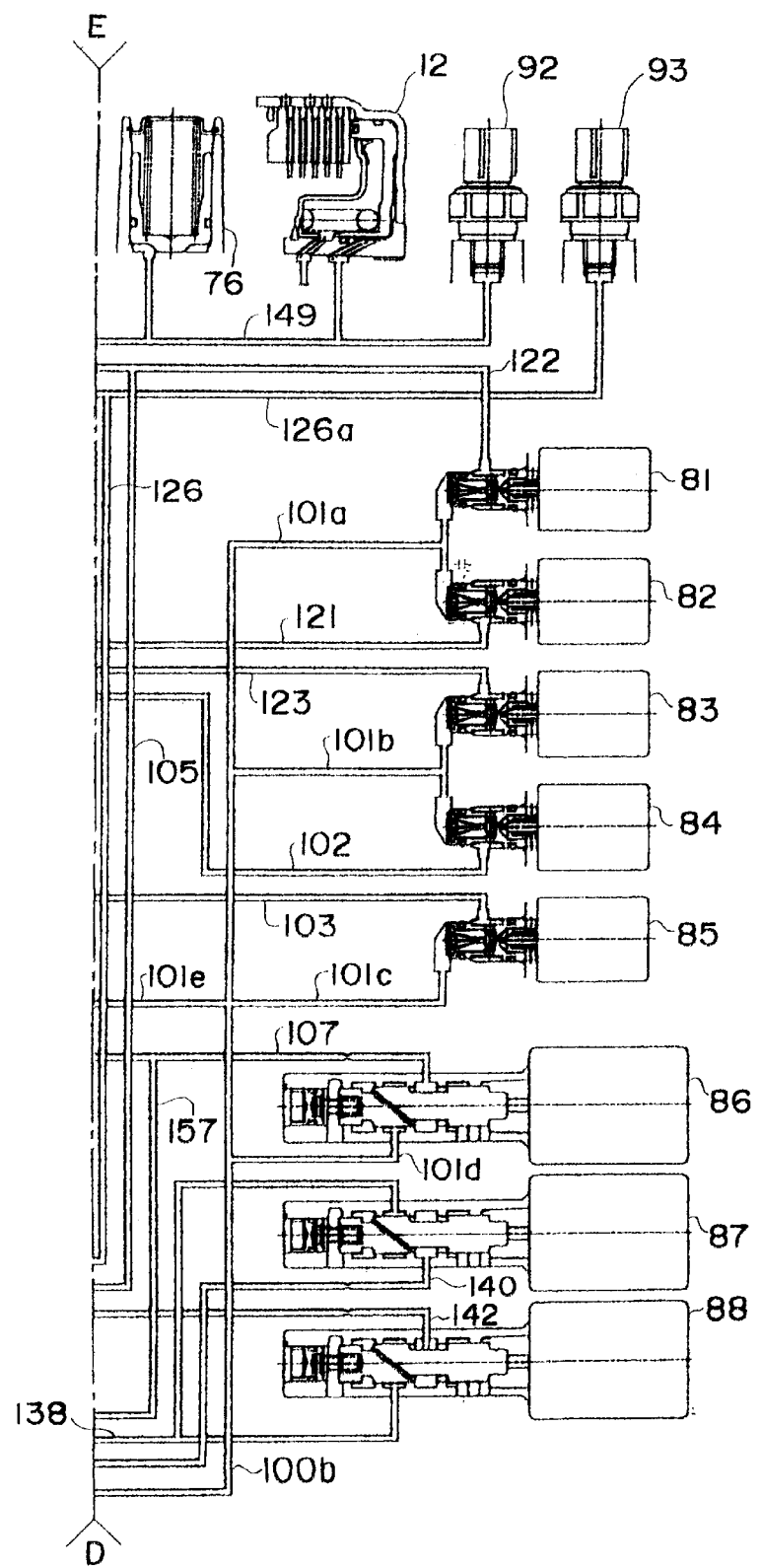
Figure 10:
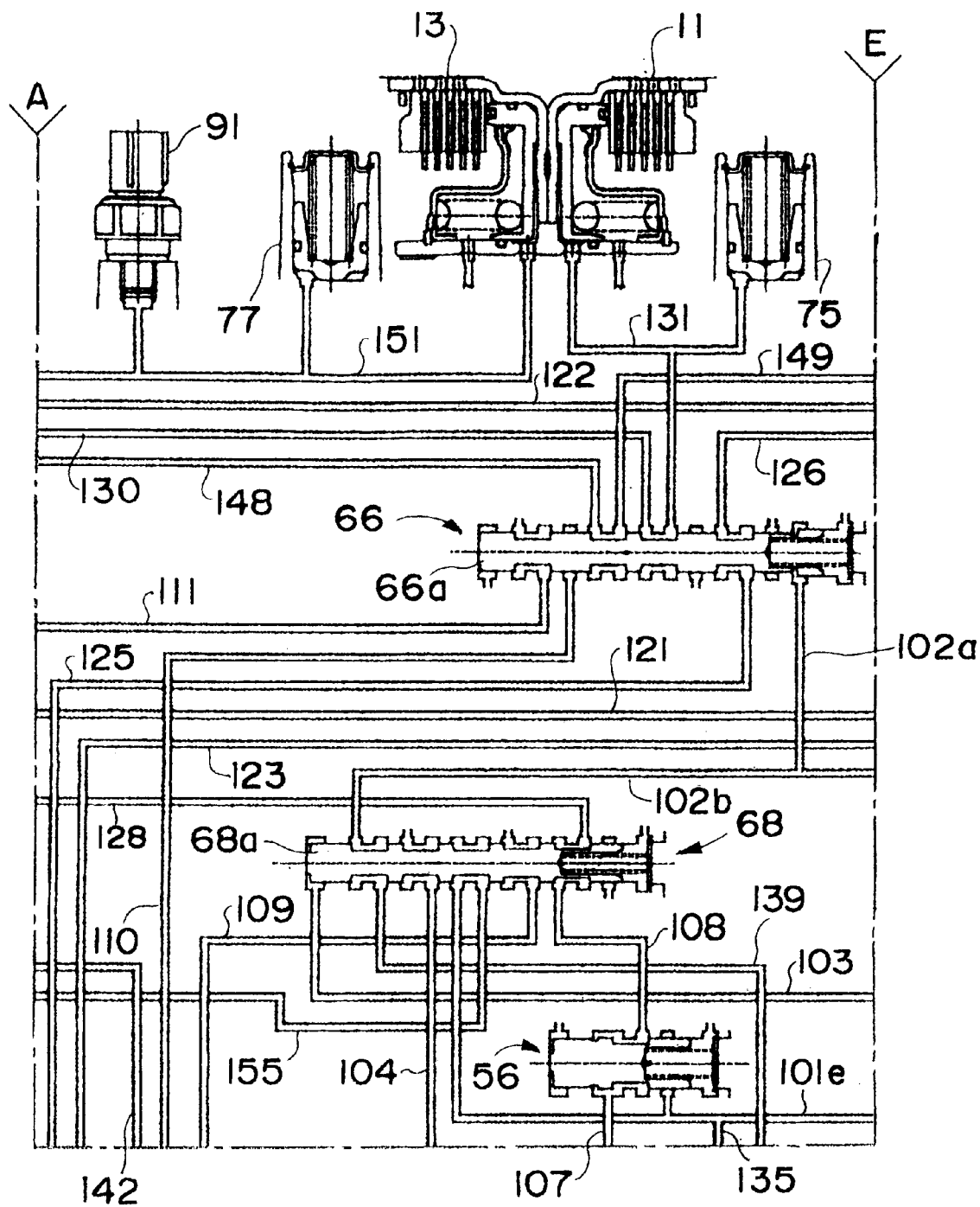

As shown in FIG. 5, a LOW accumulator 75, a SECOND accumulator 76, a THIRD accumulator 77, a FOURTH accumulator 78 and a FIFTH accumulator 79 are connected through oil passages, respectively, to the LOW clutch 11, the SECOND speed clutch 12, the THIRD speed clutch, the FOURTH speed clutch 14 and the FIFTH speed clutch 15, which constitute the automatic transmission as described above. This hydraulic circuit is also equipped with a forward/reverse selection hydraulic servomechanism 70 to operate the dog clutch 16.

Furthermore, as shown in the figure, a first shift valve 60, a second shift valve 62, a third shift valve 64, a fourth shift valve 66, a fifth shift valve 68, a CPB valve 56 and a D inhibitor valve 58 are provided to control the hydraulic pressure supplied to these clutches 11~15 and to the forward/reverse selection hydraulic servomechanism 70. To control the actuation of these valves and to control the hydraulic pressure supplied to the clutches, etc, the above mentioned first~fifth on/off solenoid valves 81~85 and the first~third linear solenoid valves 86~88 are arranged appropriately.

Now, the operation of this hydraulic circuit is described for each speed change ratio, which is established when the condition of the first~fifth on/off solenoid valves 81~85 is set as listed in Table 1 below. The first~fifth on/off solenoid valves 81~85 are normally closed valves, so each valve opens to generate a signal pressure to actuates other respective valves when its solenoid is electrically energized (i.e., while it is turned ON).

TABLE 1

| | | Solenoid valves | | | | | |
|---|---|---|---|---|---|---|---|
| | | 81 | 82 | 83 | 84 | 85 | Mode |
| R | | X | X | X | ○ | ○ | Reverse |
| N | | ○ | ○ | ○ | ○ | ○ | First NEUTRAL |
| | | ○ | X | X | ○ | X | Second NEUTRAL |

TABLE 1-continued

| | | Solenoid valves | | | | | |
|---|---|---|---|---|---|---|---|
| | | 81 | 82 | 83 | 84 | 85 | Mode |
| D | | ○ | ○ | ○ | ○ | X | F/S SECOND |
| | | X | ○ | ○ | X | X | In-gear |
| | | ○ | ○ | ○ | X | X | LOW |
| | | X | ○ | ○ | X | ○ X | 1 - 2 - 3 |
| | | X | ○ | X | X | ○ X | SECOND |
| | | X | X | X | X | ○ X | THIRD |
| | | X | X | ○ | X | ○ X | 2 - 3 - 4 |
| | | ○ | X | ○ | X | ○ X | FOURTH |
| | | ○ | X | X | X | ○ X | 4 - 5 |
| | | ○ | ○ | X | X | ○ X | FIFTH |

Note:
"○" "X" in the table represent the turning on and off of the solenoids, respectively.

At first, a description is given for the establishment of the reverse speed ratio. As shown in Table 1, the first~third on/off solenoid valves 81~83 are turned off and are closed while the fourth and fifth on/off solenoid valves 84 and 85 are turned on and are opened. In this condition, the line pressure PL which is supplied to the fourth and fifth on/off solenoid valves 84 and 85 through oil passages 101b and 101c that branch from the oil passage 100b is supplied to oil passages 102 and 103. The line pressure PL in the passage 102 acts on the right end flange portion of the fourth shift valve 66 through an oil passage 102a and shifts the spool 66a of the valve rightward (this action results in a condition opposite to that shown in the figure) . The line pressure PL in the passage 103 acts on the left end of the fifth shift valve 68 and shifts the spool 68 a of the valve rightward (this results in a condition opposite to that shown in the figure). As a result, an oil passage 102b that is branched from the passage 102 is blocked at the fifth shift valve 68.

On the other hand, the line pressure PL being supplied to the fifth shift valve 68 through an oil passage 10 le that is branched from the passage 100b is supplied through a groove provided on the spool 68a of the fifth shift valve 68 to an oil passage 104, which leads to the D inhibitor valve 58. In this condition, because an oil passage 105 connected to the left end of the D inhibitor valve 58 is connected to a drain at the first on/off solenoid valve 81, the spool 58a of the D inhibitor valve 58 is positioned to the left side of the valve, so the passage 104 is connected with a passage 106 which is connected to the left side oil chamber 72 of the forward/reverse selection hydraulic servomechanism 70. Therefore, the line pressure PL being supplied into the left side oil chamber 72 pushes rightward the piston portion 71a of a rod 71 which is provided in the forward/reverse selection hydraulic servomechanism 70. When the rod 71, which is provided with a shift fork to operate the dog clutch 16, is shifted rightward, the dog clutch 16 engages with the reverse driven gear 26c to connect it rotationally to the countershaft 3.

As mentioned previously, the reverse drive range is established when the dog clutch 16 is engaged with the reverse driven gear 26c and the FOURTH speed clutch 14 is engaged. The engagement of the FOURTH speed clutch 14 is actuated by the first linear solenoid valve 86, to which the line pressure PL is supplied through an oil passage 101d. At the first linear solenoid valve 86, the supply of the line pressure to another oil passage 107 is adjusted by means of electrical control of the current flowing through the solenoid of the valve (pressure adjustment control).

This passage 107 is connected with another oil passage 108 through the CPB valve 56, and this oil passage 108 is connected with another oil passage 109 through a passage which is created when the spool 68a of the fifth shift valve 68 is shifted rightward. This oil passage 109 is then connected with another oil passage 110 through a passage which is created by a groove of the rod 71 of the forward/reverse selection hydraulic servomechanism 70 when the rod is shifted rightward. This oil passage 110 is then connected with another oil passage 111 through a passage which is created when the spool 66a of the fourth shift valve 66 is shifted rightward. Then, this oil passage 111 is connected with another oil passage 112 through a passage which is created when the spool 60a of the first shift valve 60 is shifted rightward. This oil passage 112 is then connected with another oil passage 113 through a passage which is created when the spool 64a of the third shift valve 64 is shifted rightward. Furthermore, this oil passage 113 is connected with another oil passage 114 through a passage which is created when the spool 62a of the second shift valve 62 is shifted rightward. This oil passage 114 is then connected to the actuation oil chamber of the FOURTH speed clutch 14 and to the FOURTH accumulator 78. In this arrangement, the engagement of the FOURTH speed clutch 14 is controlled by the first linear solenoid valve 86 for setting the reverse speed ratio.

Now, the control for establishing the neutral range is described. As shown in Table 1, the neutral range comprises first and second neutral modes. The first neutral mode takes place when the neutral range (N range) or the reverse drive range (R range) is selected while the vehicle is driving at a speed greater than a predetermined speed (e.g., 10 km/h) in the forward drive range (D range). The first neutral mode functions as a reverse inhibitor to prevent the transmission from shifting to the reverse speed ratio in such a condition. The second neutral mode takes place when the transmission shifts from the reverse drive range to the neutral range and from the forward drive range to the neutral range. Moreover, when the transmission shifts from the reverse drive range through the second neutral mode to the forward drive range, the transmission goes through the in-gear mode listed in Table 1. On the other hand, if the transmission, after having shifted from the reverse drive range to the second neutral mode, is operated to shift from the second neutral mode to the reverse drive range, the transmission shifts directly to the reverse drive range without going through the in-gear mode. In the same way, the second neutral mode takes place when the transmission shifts from the forward drive range to the reverse drive range, so the reverse drive range is established after the D inhibitor valve 58 is actuated to a reverse mode. However, if the transmission, after having shifted from the forward drive range to the second neutral mode, is operated to shift from the second neutral mode to the forward drive range, the transmission shifts directly to the forward drive range without any mode change of the D inhibitor valve 58.

In the first neutral mode, all the first–fifth on/off solenoid valves 81~85 are turned on and are open. Therefore, when the mode of the transmission is changing from the reverse speed ratio or reverse drive range to the first neutral mode, the first~third on/off solenoid valves 81~83, which have been closed for setting the reverse drive range, are now opened, and the supply of hydraulic oil through these valves starts. At first, the line pressure PL which is supplied to the first on/off solenoid valve 81 through the oil passage 101a is now led to an oil passage 122 which is connected to the right end of the first shift valve 60. With this supply of the line pressure PL, the spool 60a of the first shift valve 60 is shifted leftward. As the oil passage 122 is connected also with the oil passage 105, the line pressure is supplied also to the left end of the D inhibitor valve 58 through the passage 105. As a result, the spool 58a of the D inhibitor valve shifts rightward. In this condition, the passage 106 which is connected to the left side oil chamber 72 of the forward/reverse selection hydraulic servomechanism 70 is connected to a drain through the D inhibitor valve 58, so the hydraulic oil in the left side oil chamber 72 is drained.

In the condition where the spool 58a of the D inhibitor valve 58 is shifted to the right side thereof, the line pressure PL is supplied into the D inhibitor valve 58 through the oil passages 101e and 135, and this pressure acts on the spool 58a to maintain the spool on the right side of the valve even after the line pressure supplied from the oil passage 105 is terminated. To the D inhibitor valve 58, another oil passage 139 is arranged such that the line pressure led through this passage acts on the spool 58a to shift the spool leftward. Therefore, only when the line pressure is led through this oil passage 139, the spool 58a of the D inhibitor valve 58 can shift leftward.

Also, the line pressure supplied through the oil passage 101a to the second on/off solenoid valve 82 is now led to the oil passage 121 which is connected to the right end of the second shift valve 62. With this supply of hydraulic pressure, the spool 62a of the second shift valve 62 shifts leftward. Furthermore, the line pressure supplied through the oil passage 101b to the third on/off solenoid valve 83 is led to the oil passage 123 which is connected to the right end of the third shift valve 64. With this pressure, the spool 64a of the third shift valve 64 shifts leftward. As a result, the oil passage 114 connected to the oil chamber of the FOURTH speed clutch 14 is now connected to a drain through a groove provided on the spool of the second shift valve 62, and the FOURTH speed clutch 14 is released to set a neutral condition.

In this condition, as the spool 58a of the D inhibitor valve 58 is maintained to the right side thereof, the passage 106 connected to the left side oil chamber 72 of the forward/reverse selection hydraulic servomechanism 70 is in fluid communication to a drain at the D inhibitor valve 58. On the other hand, the line pressure is supplied into the right side oil chamber 73 of the forward/reverse selection hydraulic servomechanism 70 as the oil passage 125 which is connected to the right side oil chamber 73 is in fluid communication with the oil passage 101e through an oil passage 126, the D inhibitor valve 58 and another oil passage 135. As a result, in the first neutral mode, the rod 71 of the forward/reverse selection hydraulic servomechanism 70 is shifted and maintained to the left side, so the dog clutch 16 is shifted and maintained to a D range position. In the first neutral mode, as the forward/reverse selection hydraulic servomechanism 70 remains in this condition, i.e., at the D range position, it is not possible to establish a reverse speed ratio.

In the second neutral mode, the first and fourth on/off solenoid valves 81 and 84 are turned on and are open while the second, third and fifth on/off solenoid valves 82, 83 and 85 are turned off and are closed. In response to this actuation condition of the solenoid valves, the shift valves are set as follows: the spool 60a of the first shift valve 60 is shifted leftward, the spool 62a of the second shift valve 62 is shifted rightward, the spool 64a of the third shift valve 64 is shifted rightward, the spool 66a of the fourth shift valve 66 is shifted rightward, and the spool 68a of the fifth shift valve 68 is shifted leftward.

In this condition, as the spool 66a of the fourth shift valve 66 is shifted rightward, the oil passage 125 connected to the right side oil chamber 73 of the forward/reverse selection hydraulic servomechanism 70 is connected to a drain at the fourth shift valve 66. On the other hand, the passage 106 connected to the left side oil chamber 72 of the forward/ reverse selection hydraulic servomechanism 70 is connected to a drain through the D inhibitor valve 58 and the fifth shift valve 68. As a result, without any axially acting force, the rod 71 of the forward/reverse selection hydraulic servo- mechanism 70 remains in the same condition which has existed before the transmission takes this second neutral mode. No force is generated in the axial direction until the spool 68a of the fifth shift valve 68 is shifted rightward.

Now, each mode for the forward drive range (D range) is described. The in-gear mode takes place, for example, when the shift lever is manipulated from the N position to the D position to engage gears, and the in-gear mode prepares the transmission to start the engagement of the LOW clutch 11. In this mode, the second and third on/off solenoid valves 82 and 83 are turned on and are open while the first, fourth and fifth on/off solenoid valves 81, 84 and 85 are turned off and are closed. In response to this actuation condition of the solenoid valves, the shift valves are set as follows: the spool 60a of the first shift valve 60 is shifted rightward, the spool 62a of the second shift valve 62 is shifted leftward, the spool 64a of the third shift valve 64 is shifted leftward, the spool 66a of the fourth shift valve 66 is shifted leftward, and the spool 68a of the fifth shift valve 68 is shifted leftward.

In the in-gear mode, the LOW clutch 11 is controlled to engage gradually by the first linear solenoid valve 86. The hydraulic pressure adjusted by the first linear solenoid valve 86 is supplied to the oil passage 107 which is connected with the oil passage 108 through the CPB valve 56. This oil passage 108 is connected with another oil passage 128 through a passage which is created when the spool 68a of the fifth shift valve 68 is shifted leftward. The oil passage 128 is then connected with another oil passage 129 through a passage which is created when the spool 64a of the third shift valve 64 is shifted leftward. Then, the oil passage 129 is connected with another oil passage 130 through a passage which is created when the spool 62a of the second shift valve 62 is shifted leftward. This oil passage 130 is then connected with another oil passage 131 through a passage which is created when the spool 66a of the fourth shift valve 66 is shifted leftward. This oil passage 131 is then connected to the oil chamber of the LOW clutch 11 and to the LOW accumulator 75. In this arrangement, the LOW clutch 11 is engaged gradually in correspondence to the activation of the first linear solenoid valve 86.

In the in-gear mode, the oil passage 125 connected to the right side oil chamber 73 of the forward/reverse selection hydraulic servomechanism 70 is connected with the oil passage 126 through a passage which is created by the leftward shift of the spool 66a of the fourth shift valve 66. This oil passage 126 is then connected with the oil passage 135 which leads to the oil passage 101e, through a passage created by the rightward shift of the spool 58a of the D inhibitor valve 58. On the other hand, the passage 106 connected to the left side oil chamber 72 of the forward/ reverse selection hydraulic servomechanism 70 is connected through the D inhibitor valve 58 with the oil passage 104 which is drained at the fifth shift valve 68 whose spool 68a is shifted on the left side thereof. As a result, the line pressure PL being supplied into the right side oil chamber 73 of the forward/reverse selection hydraulic servomechanism 70 acts on the rod 71 and pushes it leftward. Therefore, in the in-gear mode, the rod 71 of the forward/reverse selection hydraulic servomechanism 70 is shifted leftward as shown in the figure, so the dog clutch 16 shifts to the D range position and engages with the FOURTH speed driven gear 24b to connect it rotationally to the countershaft 3.

Now, a description is given of the LOW mode. In the LOW mode, which is set, for example, to start the vehicle when the D range is selected, the first~third on/off solenoid valves 81~83 are turned on and are opened while the fourth and fifth on/off solenoid valves 84 and 85 are turned off and are closed. In this condition, the spool 60a of the first shift valve 60 is shifted to the left side, the spool 62a of the second shift valve 62 is shifted to the left side, the spool 64a of the third shift valve 64 is shifted to the left side, the spool 66a of the fourth shift valve 66 is shifted to the left side, and the spool 68a of the fifth shift valve 68 is shifted to the left side.

The LOW mode differs from the in-gear mode only in the actuation of the first on/off solenoid valve 81. In the LOW mode, the first on/off solenoid valve 81 is turned on, so the spool 60a of the first shift valve 60 is shifted leftward. Then, the line pressure PL being supplied from the first on/off solenoid valve 81 to the oil passage 122 is led through the oil passage 105 to the left end of the D inhibitor valve 58, so the spool 58a of the D inhibitor valve 58 is shifted rightward. In this condition, the oil passage 135 branching from the oil passage 101e, to which the line pressure PL is being supplied, is connected with the oil passage 126 through the D inhibitor valve 58, so the line pressure PL is now supplied to the D inhibitor valve 58 through the oil passage 126.

In the condition where the oil passage 135 is connected with the oil passage 126, the spool 58a of the D inhibitor valve 58 is pushed rightward by the line pressure PL being supplied, so the spool 58a remains on the right side of the valve even after the line pressure supplied through the oil passage 105 is terminated. This spool 58a remains on the right side unless the line pressure from the oil passage 139 acts on the spool 58a and pushes leftward, which pressure is only available when the fourth on/off solenoid valve 84 is turned on to shift the spool 68a of the fifth shift valve 68 rightward. Therefore, once the spool 58a of the D inhibitor valve 58 is shifted rightward, it remains on the right side until the fourth on/off solenoid valve 84 is turned on.

Now, the oil passage 126 is connected with the oil passage 125 through a passage created by the leftward shift of the spool 66a of the fourth shift valve 66, so the line pressure PL is supplied through the oil passage 125 to the right side oil chamber 73 of the forward/reverse selection hydraulic servomechanism 70. As a result, the rod 71 in this valve is shifted leftward, so the dog clutch 16 is positioned at the D range position, engaging with the FOURTH speed driven gear 24b and connecting it rotationally to the countershaft 3. In the condition where the rod 71 is on the left side, the right side oil chamber 73 is connected to an oil passage 138 through which the line pressure PL is supplied to the second and third linear solenoid valves 87 and 88. Now, the line pressure PL is adjustable with the second and third linear solenoid valves 87 and 88, and this adjusted pressure can be supplied as control pressures to oil passages 140 and 142, respectively. However, no control pressure is output from these linear solenoid valves 87 and 88 in the LOW mode.

In the LOW mode, the control pressure being supplied from the first linear solenoid valve 86 to the oil passage 107 is led to the LOW clutch 11 in the same way as in the in-gear mode. Therefore, the engagement of the LOW clutch 11 is controlled in correspondence to the actuation of the first linear solenoid valve 86.

Now, a description is given of the 1-2-3 mode. This mode is set to shift the speed ratio of the transmission among the first (LOW), second, and THIRD speed ratios, i.e., to control the transition of speed ratio change. In this mode, the second and third on/off solenoid valves 82 and 83 are turned on and are opened while the first and fourth on/off solenoid valves 81 and 84 are turned off and are closed. The fifth on/off solenoid valve 85 is turned off when the FIRST speed ratio is established, and it is turned on or off in lock-up clutch actuation control (no description is provided on this control because it is not relevant to the present invention) when the second or THIRD speed ratio is established. In the 1-2-3 mode, the spool 60a of the first shift valve 60 is shifted rightward, the spool 62a of the second shift valve 62 is shifted leftward, the spool 64a of the third shift valve 64 is shifted leftward, and the spool 66a of the fourth shift valve 66 is shifted leftward.

As the fourth on/off solenoid valve 84 is turned off, the spool 58a of the D inhibitor valve 58 is maintained to the right side. In this condition, the line pressure PL is supplied to the right side oil chamber 73 of the forward/reverse selection hydraulic servomechanism 70, so the dog clutch 16 is maintained at the D range position. In this condition, the line pressure PL is supplied through the oil passage 138 to the second and third linear solenoid valves 87 and 88.

In this mode, the engagement of the LOW clutch 11, the SECOND speed clutch 12 or the THIRD speed clutch 13 is controlled in correspondence to the actuation of the first, second and third linear solenoid valve 86, 87 and 88. The control pressure being supplied from the first linear solenoid valve 86 to the oil passage 107 is led to the oil passage 108 through the CPB valve 56. This oil passage 108 is connected with the oil passage 128 through the fifth shift valve 68, and this oil passage 128 is connected with the oil passage 129 through the third shift valve 64. Then, this oil passage 129 is connected with the oil passage 130 through the second shift valve 62, and this oil passage 130 is connected with the oil passage 131 through the fourth shift valve 66. This oil passage 131 is then connected to the LOW clutch 11. In this condition, the engagement of the LOW clutch 11 is controlled by means of the control pressure supplied from the first linear solenoid valve 86.

The primary pressure of the second linear solenoid valve 87 is the pressure supplied through the oil passage 138, which pressure is supplied only when the forward/reverse selection hydraulic servomechanism 70 is set at the D range position. This primary pressure is adjusted by the second linear solenoid valve 87 to a control pressure which is supplied to an oil passage 140. In this present condition, this oil passage 140 is connected through the third shift valve 64 with an oil passage 145, which is connected with an oil passage 146 through the first shift valve 60. This oil passage 146 is then connected with another oil passage 147 through the second shift valve 62, and this oil passage 147 is then connected with another oil passage 148 through the first shift valve 60. Then, this oil passage 148 is connected with another oil passage 149 through the fourth shift valve 66, and this oil passage 149 is connected to the SECOND speed clutch 12, a hydraulic switch 92 and the SECOND accumulator 76. In this arrangement, the control pressure from the second linear solenoid valve 87 is utilized for the engagement control of the SECOND speed clutch 12. In addition, the hydraulic switch 92 is turned on for confirmation that the forward/reverse selection hydraulic servomechanism 70 is at the D range position.

The control pressure generated at the third linear solenoid valve 88 is supplied to the oil passage 142 which is connected with another oil passage 150 through the first shift valve 60. This oil passage 150 is connected through the third shift valve 64 with another oil passage 151 which is connected to the THIRD speed clutch 13 and the THIRD accumulator 77. As a result, the control pressure form the third linear solenoid valve 88 is utilized for the engagement control of the THIRD speed clutch 13.

Now, a description is given of the SECOND mode, which is set for the engagement of the SECOND speed clutch 12. In this mode, the second on/off solenoid valve 82 is turned on and is opened while the first, third and fourth on/off solenoid valves 81, 83 and 84 are turned off and are closed. The fifth on/off solenoid valve 85 is turned on or off depending upon the condition of the lock-up clutch actuation control. In this condition, the spool 60a of the first shift valve 60 is shifted rightward, the spool 62a of the second shift valve 62 is shifted leftward, the spool 64a of the third shift valve 64 is shifted rightward, and the spool 66a of the fourth shift valve 66 is shifted leftward.

As the fourth on/off solenoid valve 84 is turned off also in this mode, the spool 58a of the D inhibitor valve 58 is maintained on the right side. Therefore, the line pressure PL is supplied to the right side oil chamber 73 of the forward/reverse selection hydraulic servomechanism 70, so the dog clutch 16 is retained at the D range position. In this condition, the line pressure PL is supplied through the oil passage 138 to the second and third linear solenoid valves 87 and 88.

In this mode, the engagement of the SECOND speed clutch 12 is controlled by the control pressure supplied from the second linear solenoid valve 87 to the oil passage 140. This oil passage 140 is connected through the third shift valve 64 with the oil passage 145, which is connected with the oil passage 146 through the first shift valve 60. This oil passage 146 is then connected with the oil passage 147 through the second shift valve 62, and this oil passage 147 is connected with the oil passage 148 through the first shift valve 60. Furthermore, this oil passage 148 is connected with the oil passage 149 through the fourth shift valve 66, and this oil passage 149 is connected to the SECOND speed clutch 12 and to the SECOND accumulator 76. In this arrangement, the engagement of the SECOND speed clutch 12 is controlled by the control pressure supplied from the second linear solenoid valve 87.

Here, the control of the lock-up clutch performed by the fifth on/off solenoid valve 85 is described briefly. By the turning on or off of this solenoid valve 85, the position of the spool 68a of the fifth shift valve 68 is controlled leftward or rightward, respectively. In the condition where this spool 68a is shifted leftward, the oil passage 101e is connected with another oil passage 155, and the line pressure PL is supplied to the left end of the lock-up shift valve 51. On the other hand, in the condition where the spool 68a is shifted rightward, the oil passage 155 is connected to a drain at the fifth shift valve 68, so no pressure is supplied to the left end of the lock-up shift valve 51. In this way, the turning on and off of the fifth on/off solenoid valve 85 is utilized for the control of the actuation of the lock-up shift valve 51.

The lock-up shift valve 51 is a valve to turn on or off the lock-up actuation, and the engagement of the lock-up clutch is controlled by the control pressure supplied from the first linear solenoid valve 86. The control pressure from the first linear solenoid valve 86 is led to the oil passage 107, which is connected through another oil passage 157 to the lock-up control valve 52. Thus, the actuation of the lock-up control valve 52, which is controlled by the control pressure from the first linear solenoid valve 86, controls the engagement of the lock-up clutch. This engagement control of the lock-up clutch is carried out in the same way for the speed change ratios which are equal to or higher than the SECOND speed ratio.

Now, a description is given of the THIRD mode, which is set for the engagement of the THIRD speed clutch 13. In this mode, the first~fourth on/off solenoid valves 81~84 are turned off and are closed. The fifth on/off solenoid valve 85 is turned on or off depending upon the condition of the lock-up clutch actuation control as in the above described mode. In this condition, the spool 60a of the first shift valve 60 is shifted rightward, the spool 62a of the second shift valve 62 is shifted rightward, the spool 64a of the third shift valve 64 is shifted rightward, and the spool 66a of the fourth shift valve 66 is shifted leftward.

As the fourth on/off solenoid valve 84 is turned off also in this mode, the spool 58a of the D inhibitor valve 58 is maintained on the right side. Therefore, the line pressure PL is supplied to the right side oil chamber 73 of the forward/reverse selection hydraulic servomechanism 70, so the dog clutch 16 is retained at the D range position. In this condition, the line pressure PL is supplied through the oil passage 138 to the second and third linear solenoid valves 87 and 88.

In this mode, the engagement of the THIRD speed clutch 13 is controlled by the control pressure supplied from the third linear solenoid valve 88 to the oil passage 142, which is connected with another oil passage 160 through the first shift valve 60. This oil passage 160 is then connected with another oil passage 161 through the second shift valve 62, and this oil passage 161 is then connected through the third shift valve 64 with the oil passage 151, which is connected to the THIRD speed clutch 13 and to the THIRD accumulator 77. In this arrangement, the engagement of the THIRD speed clutch 13 is controlled by the control pressure from the third linear solenoid valve 88.

Now, a description is given of the 2-3-4 mode. This mode is set to shift the speed ratio of the transmission among the second, third and FOURTH speed ratios, i.e., to control the transition of speed ratio change. In this mode, the third on/off solenoid valve 83 is turned on and is opened while the first, second and fourth on/off solenoid valves 81, 82 and 84 are turned off and are closed. The fifth on/off solenoid valve 85 is used in the lock-up clutch actuation control as briefly described above. In the 2-3-4 mode, the spool 60a of the first shift valve 60 is shifted rightward, the spool 62a of the second shift valve 62 is shifted rightward, the spool 64a of the third shift valve 64 is shifted leftward, and the spool 66a of the fourth shift valve 66 is shifted leftward.

Also in this mode, as the fourth on/off solenoid valve 84 is turned off, the spool 58a of the D inhibitor valve 58 is maintained on the right side thereof. In this condition, the line pressure PL is supplied to the right side oil chamber 73 of the forward/reverse selection hydraulic servomechanism 70, so the dog clutch 16 is retained at the D range position. In this condition, the line pressure PL is supplied through the oil passage 138 to the second and third linear solenoid valves 87 and 88.

In this mode, the engagement of the SECOND speed clutch 12, the THIRD speed clutch 13 and the FOURTH speed clutch 14 is controlled in correspondence to the actuation of the first, second and third linear solenoid valves 86, 87 and 88 to shift the transmission smoothly among these speed change ratios.

The control pressure supplied from the first linear solenoid valve 86 to the oil passage 107 is led to the oil passage 108 through the CPB valve 56. This oil passage 108 is connected through the fifth shift valve 68 with the oil passage 128, which is connected with the oil passage 129 through the third shift valve 64. Then, this oil passage 129 is connected with the oil passage 147 through the second shift valve 62, and this oil passage 147 is connected with the oil passage 148 through the first shift valve 60. This oil passage 148 is then connected through the fourth shift valve 66 with the oil passage 149, which is connected to the SECOND speed clutch 12. In this arrangement, the engagement of the SECOND speed clutch 12 is controlled by the control pressure supplied from the first linear solenoid valve 86.

The control pressure from the second linear solenoid valve 87 is led to the oil passage 140, which is connected with the oil passage 113 through the third shift valve 64. This oil passage 113 is connected with the oil passage 114 through the second shift valve 62, and this oil passage 114 is connected to the FOURTH speed clutch 14 and to the FOURTH accumulator 78. In this arrangement, the engagement of the FOURTH speed clutch 14 is control by the control pressure supplied from the second linear solenoid valve 87.

The control pressure from the third linear solenoid valve 88 is supplied to the oil passage 142, which is connected with the oil passage 150 through the first shift valve 60. This oil passage 150 is then connected with the oil passage 151 through the third shift valve 64, and then this oil passage 151 is connected to the THIRD speed clutch 13 and to the THIRD accumulator 77. In this arrangement, the engagement control of the THIRD speed clutch 13 is controlled by the control pressure form the third linear solenoid valve 88.

Now, a description is given of the FOURTH mode, which is set for the engagement of the FOURTH speed clutch 14. In this mode, the first and third on/off solenoid valves 81 and 83 are turned on and are opened while the second and fourth on/off solenoid valves 82 and 84 are turned off and are closed. The fifth on/off solenoid valve 85 is turned on or off depending upon the condition of the lock-up clutch actuation control as described above. In this condition, the spool 60a of the first shift valve 60 is shifted leftward, the spool 62a of the second shift valve 62 is shifted rightward, the spool 64a of the third shift valve 64 is shifted leftward, and the spool 66a of the fourth shift valve 66 is shifted leftward.

Also, in this mode, as the fourth on/off solenoid valve 84 is turned off, the spool 58a of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. The line pressure PL is also supplied through the oil passage 138 to the second and third linear solenoid valves 87 and 88.

In this mode, the engagement of the FOURTH speed clutch 14 is controlled by the control pressure supplied from the second linear solenoid valve 87 to the oil passage 140, which is connected with the oil passage 113 through the third shift valve 64. This oil passage 113 is connected with the oil passage 114 through the second shift valve 62, and this oil passage 114 is then connected to the FOURTH speed clutch 14 and to the FOURTH accumulator 78. In this arrangement, the engagement of the FOURTH speed clutch 14 is controlled by the control pressure from the second linear solenoid valve 87.

Now, a description is made of the 4-5 mode, which is set to shift the speed ratio of the transmission between the fourth and FIFTH speed ratios, i.e., to control the transition of speed ratio change. In this mode, the first on/off solenoid valve 81 is turned on and is opened while the second fourth on/off solenoid valves 82, 83 and 84 are turned off and are closed. The fifth on/off solenoid valve 85 is used in the lock-up clutch actuation control. In the 4-5 mode, the spool 60a of the first shift valve 60 is shifted leftward, the spool 62a of the second shift valve 62 is shifted rightward, the spool 64a of the third shift valve 64 is shifted rightward, and the spool 66a of the fourth shift valve 66 is shifted leftward.

Also in this mode, as the fourth on/off solenoid valve 84 is turned off, the spool 58a of the D inhibitor valve 58 is retained on the right side thereof. In this condition, the line pressure PL is supplied to the right side oil chamber 73 of the forward/reverse selection hydraulic servomechanism 70, so the dog clutch 16 is retained at the D range position. Furthermore, the line pressure PL is supplied through the oil passage 138 to the second and third linear solenoid valves 87 and 88.

In this mode, the engagement of the FOURTH speed clutch 14 and of the FIFTH speed clutch 15 is controlled in correspondence to the actuation of the second and third linear solenoid valves 87 and 88, respectively, to change the speed ratio of the transmission smoothly.

The control pressure from the second linear solenoid valve 87 is led to the oil passage 140. This oil passage 140 is connected with the oil passage 113 through the third shift valve 64, and this oil passage 113 is connected through the second shift valve 62 with the oil passage 114, which is connected to the FOURTH speed clutch 14 and to the FOURTH accumulator 78. In this arrangement, the engagement of the FOURTH speed clutch 14 is controlled by the control pressure from the second linear solenoid valve 87.

On the other hand, the control pressure from the third linear solenoid valve 88 is led to the oil passage 142, which is connected with another oil passage 170 through first shift valve 60. This oil passage 170 is then connected through the third shift valve 64 with another oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

Now, a description is made of the FIFTH mode, which is set for the engagement of the FIFTH speed clutch 15. In this mode, the first and second on/off solenoid valves 81 and 82 are turned on and are opened while the third and fourth on/off solenoid valves 83 and 84 are turned off and are closed. The fifth on/off solenoid valve 85 is turned on or off depending upon the condition of the lock-up clutch actuation control as described above. In this condition, the spool 60a of the first shift valve 60 is shifted leftward, the spool 62a of the second shift valve 62 is shifted leftward, the spool 64a of the third shift valve 64 is shifted rightward, and the spool 66a of the fourth shift valve 66 is shifted leftward.

Also, in this mode, as the fourth on/off solenoid valve 84 is turned off, the spool 58a of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. The line pressure PL is also supplied through the oil passage 138 to the second and third linear solenoid valves 87 and 88.

In this mode, the engagement of the FIFTH speed clutch 15 is controlled by the control pressure supplied from the third linear solenoid valve 88 to the oil passage 142, which is connected with the oil passage 170 through the first shift valve 60. This oil passage 170 is connected through the third shift valve 64 with the oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

As described above, each mode is established by controlling the turning on and off of the first~fifth on/off solenoid valves 81~85 as listed in Table 1. The alphabets on the left side of Table 1, "R", "N" and "D", represent the reverse drive range, the neutral range and the forward drive range, respectively, which are switched one after another in correspondence to the manipulation of the shift lever at the driver's seat. For example, in a case where the shift lever is manipulated to shift the range setting of the transmission from the R range through the N range to the D range, at first, the second neutral mode is set as the N range. In this N range condition, the rod 71 of the forward/reverse selection hydraulic servomechanism 70 is retained at the reverse drive position without any force acting in the axial direction. Thereafter, when the shift lever is manipulated to the D range, the control system proceeds to set the transmission into the in-gear mode and then into the LOW mode.

On the other hand, in a case where the shift lever is manipulated to switch the range of the transmission from the D range to the N range and then from the N range to the R range, if the speed of the vehicle at the time of the switching to the N range is less than a critical speed or predetermined speed (e.g., 10 km/h), then the control system sets the second neutral mode. In this N range condition, the rod 71 of the forward/reverse selection hydraulic servomechanism 70 is retained at the forward drive position without any force acting in the axial direction. Thereafter, when the shift lever is manipulated to the R range, the control system proceeds to set the transmission into the REVERSE mode.

On the other hand, if the speed of the vehicle at the time of the switching to the N range is equal to or more than the critical speed, then the control system sets the first neutral mode. As described above, in this mode, the rod 71 of the forward/reverse selection hydraulic servomechanism 70 is retained at the forward drive position with a force acting in the axial direction toward the forward drive position, which force is generated by the line pressure supplied into the right side oil chamber 73. In this condition, even if a solenoid valve malfunctions and engages a corresponding clutch, the reverse speed ratio cannot be established. When the speed of the vehicle decreases below the critical speed, the first neutral mode is switched to the second neutral mode. However, if the shift lever is manipulated to set the R range while the vehicle is driving still at a speed equal to or more than the critical speed, then the control system retains the first neutral mode and does not proceed to set the REVERSE mode, i.e., the control system provides the above mentioned inhibitor function. Thereafter, when the vehicle speed decreases below the critical speed, the control system proceeds to set the transmission into the REVERSE mode.

Finally, a description is made of the F/S (Fail Safe) SECOND mode. This mode is set to secure a certain driving performance by fixing the transmission to the SECOND speed ratio when the transmission experiences a breakdown. In this mode, the first~fourth on/off solenoid valves 81~84 are turned on and are opened while the fifth on/off solenoid valve 85 is turned off and is closed. In this condition, the spool 60a of the first shift valve 60 is shifted leftward, the spool 62a of the second shift valve 62 is shifted leftward, the spool 64a of the third shift valve 64 is shifted leftward, the spool 66a of the fourth shift valve 66 is shifted rightward, and the spool 68a of the fifth shift valve 68 is shifted leftward.

In this mode, the engagement of the SECOND speed clutch 12 is controlled by the control pressure supplied from the first linear solenoid valve 86 to the oil passage 107, which is connected with the oil passage 108 through the CPB valve 56. This oil passage 108 is connected with the oil passage 128 through the fifth shift valve 68, and this oil passage 128 is connected with the oil passage 129 through the third shift valve 64. This oil passage 129 is then connected with the oil passage 130 through the second shift valve 62, and this oil passage 130 is connected through the fourth shift valve 66 with the oil passage 149, which is connected to the SECOND speed clutch 12 and to the SECOND accumulator 76. In this arrangement, the engagement of the SECOND speed clutch 12 is controlled by the control pressure supplied from the first linear solenoid valve 86.

It can be understood from the above description that the engagement of the second~FIFTH speed clutches 12~15 are controlled for setting the SECOND mode and higher modes (excluding the F/S mode), respectively, by the control pressures which are supplied from the second and third linear solenoid valves 87 and 88. The primary pressures supplied to the second and third linear solenoid valves 87 and 88 are led through the forward/reverse selection hydraulic servomechanism 70. For example, if the forward/reverse selection hydraulic servomechanism 70 experiences an operational failure, then these clutches cannot be controlled systematically. However, the engagement of the SECOND speed clutch 12 in the F/S (Fail Safe) SECOND mode is controlled by the first linear solenoid valve 86, which utilizes the line pressure PL being supplied directly from the oil passage 100b bypassing the forward/reverse selection hydraulic servomechanism 70. Therefore, the SECOND speed ratio can be established regardless of any operational failure of the forward/reverse selection hydraulic servomechanism 70.

This control system is constructed also to detect failures. When the system detects a failure, it automatically switches the operational mode of the transmission into the F/S SECOND mode and secures a certain driving performance. For detecting failures, a plurality of hydraulic switches 91, 92 and 93 are provided and arranged as shown in the figures. One hydraulic switch 91 detects the pressure of the THIRD speed clutch, another hydraulic switch 92 detects the pressure of the SECOND speed clutch, and the other hydraulic switch 93 detects the pressure of the right side oil chamber 73 of the forward/reverse selection hydraulic servomechanism 70. In addition, the control system detects the actuation signals of the first~fifth on/off solenoid valves 81~85 and continually monitors what mode the transmission is in.

With the hydraulic switch 93 which is sensitive to the pressure inside the right side oil chamber 73 of the forward/reverse selection hydraulic servomechanism 70, the system can detect at which side, i.e, the reverse drive range or the forward drive range, the dog clutch 16 is set by the forward/reverse selection hydraulic servomechanism 70. In this way, the system monitors the condition of the dog clutch together with the condition of the first~fifth on/off solenoid valves 81~85 through the above mentioned actuation signals. As a result, the system is capable of determining a failure if it may happen. For example, if the line pressure exists in the left side oil chamber 72, indicating the dog clutch 16 being set at the R range position, while the actuation signals of the first~fifth on/off solenoid valves 81~85 are detected to correspond to one of the modes set for the D range, the system judges this condition as a failure. In the same way, if the line pressure exists in the right side oil chamber 73, indicating the dog clutch 16 being set at the D range position, while the actuation signals of the first~fifth on/off solenoid valves 81~85 are detected to correspond to a mode for the R range, the system also judges this condition as a failure.

The control system according to the present invention determines from the position of the forward/reverse selection hydraulic servomechanism 70 and from the pattern of the actuation signals whether they are in harmony and the transmission is operating normally or not. Therefore, if the system detects by the hydraulic switch 93 that the forward/reverse selection hydraulic servomechanism 70 is positioned at the D range, then the system can also control the actuation of the solenoid valves by sending command signals which will set the respective modes of the D range. Because the system functions this way, for example, even if an electrical failure causes the actual pattern of the actuation signals (i.e., the actuation on/off signals of the first~fifth on/off solenoid valves 81~85) to differ from those for setting the modes of the D range, or one of the solenoid valves malfunctions and tries to set a range other than the intended range, the forward/reverse selection hydraulic servomechanism 70 remains at the D range position. There is no possibility of the transmission switching to the R range. In addition, even if a combination of signals which may resemble to the pattern of signals setting one of the modes of the D range is used for establishing another range, there is no possibility of malfunctioning.

The hydraulic switch 93 is connected to the right side oil chamber 73 of the forward/reverse selection hydraulic servomechanism 70 through the fourth shift valve 66, which is turned off for all the modes of the D range and turned on for the neutral modes and the reverse mode as shown in FIG. 1. In this arrangement, whether the transmission is in the D range or not is determinable from the turning on or off of the fourth shift valve 66, so the control system can be designed such that the pressure in the right side oil chamber 73 may be detected by the hydraulic switch 93 only while the transmission is in D range. With the arrangement of the hydraulic switch 93 being connected to the right side oil chamber 73 through the fourth shift valve 66, the determination of whether the D range is set or not is carried out more reliably.

Furthermore, it can be understood from TABLE 1 that the transition to a next mode in the D range is carried out by changing only one signal in the combination of the on/off actuation signals of the first~fifth on/off solenoid valves 81~85. Therefore, for example, a signal change made in one solenoid valve results in a change from a present speed change ratio to a transitional mode, which controls or smoothes the shifting from the present speed ratio. A signal change made in another solenoid valve brings this transitional mode to a next speed change ratio, and so on, except the transition between the 1-2-3 mode and the THIRD mode. In this way, signals sent to a plurality of solenoid valves are never changed in plurality, so the speed change control or shift control is made simple and stable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-119658 filed on Apr. 27, 1999, which is incorporated here in by reference.

What is claimed is:

1. A control system for an automatic transmission which comprises a power transmission mechanism incorporating a plurality of power transmission paths and a plurality of hydraulically operated frictionally engaging means for selecting said power transmission paths individually, and a plurality of shift control valves for controlling supply of hydraulic oil to said hydraulically operated frictionally engaging means without a manual valve;

said control system comprising a plurality of solenoid valves for supplying and draining a line pressure;

wherein:

said line pressure supplied and drained from said solenoid valves are used to actuate said shift control valves for selecting said power transmission paths in speed change control;

a plurality of combinations of on/off operations of said solenoid valves are switched for selecting said power transmission paths individually, thereby establishing a forward drive range, a neutral range and a reverse drive range in response to a shift manipulation; and said neutral range comprises a first neutral mode and a second neutral mode which are set in response to said shift manipulation carried out to establish said neutral range, said first neutral mode being set by a combination of on/off operations of said solenoid valves if a vehicle incorporating said automatic transmission is driving at a speed equal to or more than a critical speed while said second neutral mode being set by another combination of on/off operations of said solenoid valves if said vehicle is driving at a speed less than said critical speed;

wherein when said first neutral mode is once set, as long as said vehicle speed is equal to or more than said critical speed, said combination of on/off operations of said solenoid valves for setting said first neutral mode is maintained even if a shift manipulation to said reverse range is carried out.

2. The control system as set forth in claim 1, further comprising a forward/reverse hydraulic servomechanism for selecting either said power transmission paths which belong to said forward drive range or said power transmission paths which belong to said reverse drive range;

wherein:

while said automatic transmission is in said first neutral mode, said forward/reverse hydraulic servomechanism selects said power transmission paths of said forward drive range.

3. The control system as set forth in claim 1, further comprising a forward/reverse hydraulic servomechanism for selecting either said power transmission paths which belong to said forward drive range or said power transmission paths which belong to said reverse drive range;

wherein:

while said automatic transmission is in said second neutral mode, said forward/reverse hydraulic servomechanism selects said power transmission paths of a drive range which has been established just before said second neutral mode is set.

4. The control system as set forth in claim 2 or claim 3, wherein:

said power transmission paths of said reverse drive range include a dog clutch, which is actuated by said forward/reverse hydraulic servomechanism, and a hydraulic clutch, which is arranged in series with said dog clutch; and said power transmission paths of said forward drive range comprise two groups of power transmission paths, said power transmission paths of one group including said dog clutch, which is actuated by said forward/reverse hydraulic servomechanism, and a hydraulic clutch, which is arranged in series with said dog clutch, and said power transmission paths of the other group including only a hydraulic clutch.

\* \* \* \* \*